March 1, 1932.  E. RECTOR  1,848,089
INTERNAL COMBUSTION ENGINE
Filed Jan. 22, 1930

Inventor
Enoch Rector
By Brown, Jackson, Boettcher & Diemer
Attys.

Patented Mar. 1, 1932

1,848,089

UNITED STATES PATENT OFFICE

ENOCH RECTOR, OF NEW YORK, N. Y., ASSIGNOR TO WAUKESHA MOTOR COMPANY, OF WAUKESHA, WISCONSIN, A CORPORATION OF WISCONSIN

INTERNAL COMBUSTION ENGINE

Application filed January 22, 1930. Serial No. 422,506.

This invention relates to internal combustion engines, and more particularly to engines which employ a combustion chamber overlying a portion of the cylinder area at one side thereof and a relief or increased clearance space over the piston and opening into the combustion chamber.

More specifically, my invention is in the nature of an improvement upon the internal combustion engine disclosed in United States Letters Patent No. 1,671,926, issued May 29, 1928, to Jesse Floid Coverstone. The primary object of my invention is to provide increased efficiency and decreased tendency to detonate in an engine of the type referred to, particularly when applied to comparatively large engines having cylinders of large diameter. Further objects and advantages of my invention will appear from the detailed description.

Figure 1:
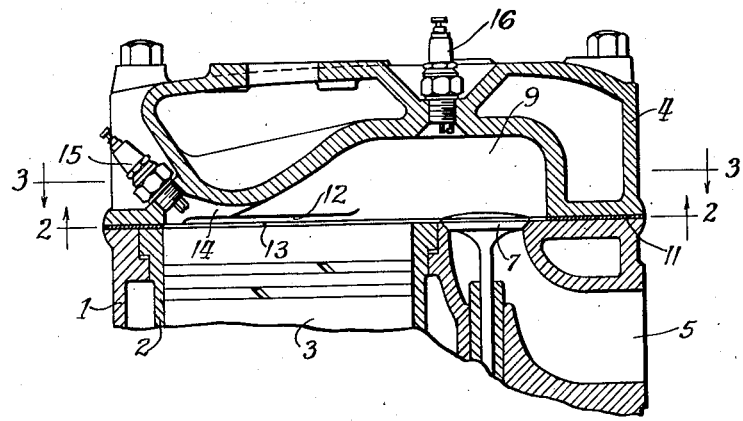
Figure 1 is a fragmentary vertical sectional view taken through the head and the upper portion of the cylinder block of an engine constructed in accordance with my invention, this section being taken substantially on the section line 1—1 of Figure 3.

I have illustrated my invention and applied to an engine comprising a cylinder block 1, a cylinder 2 suitably supported in the block, a piston 3 reciprocating in the cylinder, and a head 4 secured upon the upper end of block 1, in a known manner, and overlying the cylinder area.

The block 1 is provided, adjacent one side of the cylinder, with fuel mixture inlet and burnt gas outlet passages 5 and 6, respectively, controlled by inlet and exhaust valves 7 and 8, respectively, which are operated in a known manner. Head 4 is provided, in the under face thereof, with a combustion chamber 9 which overlies a portion of the cylinder at one side thereof. This combustion area at one side thereof. This combustion chamber also overlies the passages 5 and 6 and the valves 7 and 8, respectively, therefor.

Figure 2:
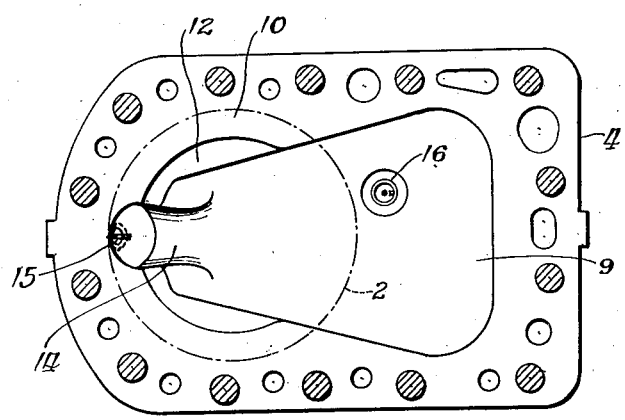
Figure 2 is an underneath view of the head, taken substantially in the plane of line 2—2 of Figure 1.
Figure 3:
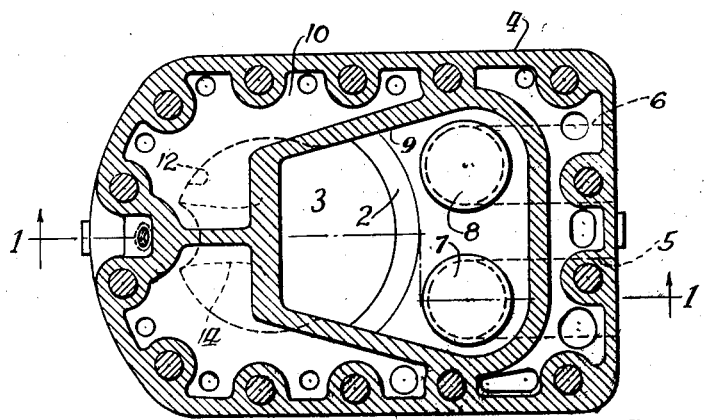
Figure 3 is a section taken substantially on line 3—3 of Figure 1.

The under face of lower wall 10 is flat or planar and seats upon the upper face of a suitable gasket 11 interposed between the head and the cylinder block. The combustion chamber 9 tapers inwardly and downwardly over the cylinder area, and the area of communication between this chamber and the cylinder is less than that of the cylinder 4, as will be clear from Figures 2 and 3. The central portion of lower wall 10 of the head, adjacent the inner portion of combustion chamber 4, is raised to provide increased clearance 12 over the central portion of the cylinder area and, therefore, over the central portion of the piston. The remainder of the area of the portion of wall 10 which overlies the cylinder area is disposed closely adjacent the upper end of the cylinder area and forms, with the upper face of the piston 3, when the piston is in the position of greatest compression, a shielded space 13 which is of much less height than space 12 and is ineffective as a combustion space, due to the relative thinness of the layer of combustible mixture in such space and the cooling effect of the surrounding surfaces in contact with this layer of combustible mixture in the space 13.

It will thus be seen that, when the piston 3 is in the position of greatest compression, the combustion chamber 9 and the increased clearance space 12 which is, in fact, a continuation of the combustion chamber, constitute all of the effective combustion space. This is in accordance with the disclosure of the Coverstone patent, above identified.

Head 4 is provided with a channel 14 which leads from combustion chamber 9 to a spark plug 15, located at the end of the channel, at the edge of the cylinder most remote from combustion chamber 9. Spark plug 15 is secured in head 4, in a known manner, the electrodes of this spark plug extending into the end of the channel 14. A similar spark plug 16 is secured in head 4 and disposed for igniting the fuel charge in combustion chamber 9. Preferably two spark plugs are employed, disposed as illustrated.

The spark plug 15 serves to ignite the fuel charge in the increased clearance space 12 and at the adjacent portion of the combustion chamber. The provision of this spark plug, in conjunction with the spark plug 16, results in more rapid flame propagation and reduces tendency to detonate, as well as effecting increased efficiency in operation of the engine.

This is particularly true of large engines in which the length of flame travel becomes so great, when the fuel is initially ignited in the combustion chamber only, that a degree of spark advance is required which reduces efficiency and power. It is also noticeable that, in such an engine, detonation is aggravated as a result of the long flame travel. By igniting the fuel charge in the relief or increased clearance space 12, these objections are avoided and the performance of the engine is markedly superior to that of an engine in which the fuel charge is ignited in the combustion chamber at one point only.

What I claim is:

1. In an internal combustion engine, a cylinder, a piston reciprocating in the cylinder, a head for said cylinder having a lower wall overlying and closely adjacent a portion of the cylinder area, fuel mixture inlet and burnt gas outlet passages at one side of the cylinder, valves controlling said passages, the head being provided in its underface with a combustion chamber overlying a portion of the cylinder area at one side thereof, said chamber also overlying said valves and passages, the lower wall of the head having a recess over the central portion of the cylinder area providing a space of less height than and constituting a continuation of the combustion chamber toward the other side of the cylinder area, said combustion chamber representing all of the effective combustion space when the piston is in the position of greatest compression, and spark means for igniting the fuel charge in said continuation of the combustion chamber.

2. In an internal combustion engine, a cylinder, a piston reciprocating in the cylinder, fuel mixture inlet and burnt gas outlet passages at one side of the cylinder, valves controlling said passages, a combustion chamber overlying said valves and passages and a portion of the cylinder area at one side thereof, the combustion chamber having an extension greatly reduced in height and overlying the central portion of the cylinder area, said chamber and the extension thereof constituting all of the effective combustion space when the piston is in the position of greatest compression, spark means for igniting the fuel charge in said extension of the combustion chamber, and spark means for igniting the fuel charge in the main portion of the combustion chamber.

3. In an internal combustion engine, a cylinder, a piston reciprocating in the cylinder, a head for said cylinder providing a combustion chamber overlying a portion only thereof and by means of a narrowed extension communicating therewith over an area including the center thereof, the remainder of the area of the piston when in the position of greatest compression being in close proximity to said head at the sides and end of said extension, fuel mixture inlet and burnt gas outlet passages, spark means for igniting the fuel charge in the combustion chamber, and spark means for igniting the fuel charge in said extension of the chamber.

4. In an internal combustion engine, a cylinder, a piston reciprocating in the cylinder, a head for said cylinder provided with a combustion chamber overlying a portion of the cylinder area at one side thereof, the clearance space over the central portion of the cylinder area being increased relative to the clearance space over the remainder of the cylinder area and forming an extension of the combustion chamber toward the side of the cylinder opposite to said chamber, the remainder of the area of the piston when in the position of greatest compression being in close proximity to the remainder of the area of the portion of the head overlying the cylinder area, spark means for igniting the fuel charge in the combustion chamber, and spark means for igniting the fuel charge in said extension and at a point adjacent the end thereof remote from the combustion chamber.

5. In an internal combustion engine, a cylinder, a piston reciprocating in the cylinder, a head for said cylinder provided with a combustion chamber overlying a portion of the cylinder area at one side thereof and with a channel overlying a portion of the cylinder area adjacent the opposite side thereof, said head having a lower wall overlying the cylinder area about the chamber and the channel, said channel forming an extension of the combustion chamber and establishing communication between the same and the side of the cylinder remote from said chamber, fuel mixture inlet and burnt gas outlet passages for the combustion chamber, valves controlling said passages, spark means for igniting the fuel charge in the combustion chamber, and spark means for igniting the charge at the end of the channel.

6. In an internal combustion engine, a cylinder, a piston reciprocating in the cylinder, a head for said cylinder provided with a combustion chamber overlying a portion of the cylinder area at one side thereof and with a channel overlying and opening into a portion of the cylinder area adjacent the opposite side thereof, said head having a lower wall overlying the cylinder area about the chamber and the channel, a portion of said wall over the central portion of the cylinder area having a recess extending from the chamber to the channel and providing increased clearance space relative to the clearance space over the remainder of the cylinder area and above the piston when said piston is in the position of greatest compression, the remainder of the area of the wall overlying the cylinder area being in close proximity to the piston when the piston is in said position, fuel mixture inlet and burnt gas outlet passages for the combustion chamber, valves controlling said passages, spark means for igniting the fuel charge in the combustion chamber, and spark means for igniting the charge in the channel.

7. In an internal combustion engine, a cylinder, a piston reciprocating in the cylinder, a head for the cylinder having a combustion chamber overlying a portion of the cylinder area at one side thereof, the clearance space over the central portion of the cylinder area and extending toward the other side thereof being increased relative to the clearance space over the remainder of the cylinder area and the remainder of the area of the piston being in close proximity to the under face of the overlying portion of the head when said piston is in the position of greatest compression, said increased clearance space opening into and forming a continuation of the combustion chamber, said combustion chamber constituting all of the effective combustion space when the piston is in said position of greatest compression, and spark means for igniting the fuel charge in the increased clearance space.

8. In an internal combustion engine, a cylinder, a piston reciprocating in the cylinder, a head for the cylinder having a combustion chamber overlying a portion of the cylinder area at one side thereof, the clearance space over the central portion of the cylinder area and extending toward the other side thereof being increased relative to the clearance space over the remainder of the cylinder area and the remainder of the area of the piston being in close proximity to the under face of the overlying portion of the head when said piston is in the position of greatest compression, said increased clearance space opening into and forming a continuation of the combustion chamber, said combustion chamber constituting all of the effective combustion space when the piston is in said position of greatest compression, spark means for igniting the fuel charge in the increased clearance space, and spark means for igniting the fuel charge in the combustion chamber.

In witness whereof, I hereunto subscribe my name this 31st day of December, 1929.

ENOCH RECTOR.